(12) United States Patent
Paluncic et al.

(10) Patent No.: US 7,789,203 B2
(45) Date of Patent: Sep. 7, 2010

(54) LUBRICATING DEVICE AND LUBRICATION APPARATUS COMPRISING SAID DEVICE

(75) Inventors: Zdravko Paluncic, Ludwigshaften (DE); Karl Rodemer, Heidelberg (DE)

(73) Assignee: Lincoln GmbH, Walldorf (DE)

( * ) Notice: Subject to any disclaimer, the term of this patent is extended or adjusted under 35 U.S.C. 154(b) by 0 days.

(21) Appl. No.: 12/588,649

(22) Filed: Oct. 22, 2009

(65) Prior Publication Data

US 2010/0038178 A1 Feb. 18, 2010

Related U.S. Application Data

(62) Division of application No. 10/535,829, filed as application No. PCT/EP2004/005463 on May 20, 2005, now Pat. No. 7,677,361.

(30) Foreign Application Priority Data

Aug. 20, 2003 (DE) .............................. 203 12 833 U

(51) Int. Cl.
*F16N 7/16* (2006.01)
(52) U.S. Cl. ........................ 184/15.1; 184/15.2; 184/26; 184/34
(58) Field of Classification Search ................ 184/15.1, 184/15.2, 26, 34; 222/35
See application file for complete search history.

(56) References Cited

U.S. PATENT DOCUMENTS

| 3,221,948 | A | | 12/1965 | Kalist |
| 4,009,764 | A | * | 3/1977 | Hafner ........................ 184/15.2 |
| 4,494,913 | A | | 1/1985 | Keller et al. |

(Continued)

FOREIGN PATENT DOCUMENTS

CH 339 012 6/1959

*Primary Examiner*—John Q Nguyen
*Assistant Examiner*—Robert T Reese
(74) *Attorney, Agent, or Firm*—Wenderoth, Lind & Ponack, L.L.P.

(57) ABSTRACT

The invention relates to a lubricating device, particularly for use in an apparatus which is used to lubricate mobile lubrication points e.g. on a rotating belt or chain belt. A lubricant discharge body of a lubricating head, which when lubricant is conveyed by a feed pump into a dosing chamber which is separated from the lubricant discharge channel, is placed in a front standby position and, counter to the effect of a restoring force, is moved into a locking and lubricant release position wherein the link between the pump and the dosing chamber is blocked by a reversing piston and the dosing chamber is fluidically connected to the lubricant discharge channel and a predefined volume of lubricant can be pumped out of the dosing chamber into the lubricant discharge channel. The lubricant discharge body cooperates with a reversing piston in such a way that the feed pump is fluidic ally connected to the dosing chamber of a dosing piston/cylinder arrangement via an annular area of the reversing piston when the lubricant discharge body is located in a front standby position, and such that the dosing chamber is fluidically connected to the lubricant discharge channel via the angular area when the lubricant discharge body is placed in a retracted position in which the lubricant is released. The reversing piston blocks the fluidic connection between the feed pump and the dosing chamber such that the amount of lubricant provided for discharge can be pumped out of the dosing chamber in the direction of the annular area by a dosing piston which is impinged upon by the feed pump.

10 Claims, 4 Drawing Sheets

U.S. PATENT DOCUMENTS

| | | | |
|---|---|---|---|
| 5,636,709 A * | 6/1997 | Fujita et al. .................. 184/16 |
| 5,638,920 A | 6/1997 | Gruett |
| 6,071,097 A | 6/2000 | Gruett et al. |
| 6,357,922 B1 | 3/2002 | Harbottle et al. |
| 6,986,407 B2 | 1/2006 | Conley et al. |
| 7,677,361 B2 * | 3/2010 | Paluncic et al. ............ 184/15.1 |
| 2005/0000752 A1 * | 1/2005 | Fleige ....................... 184/15.1 |

* cited by examiner

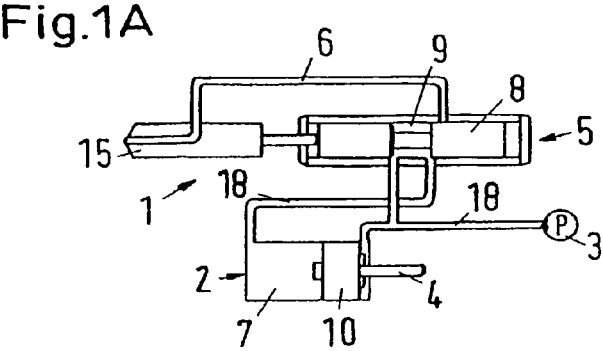
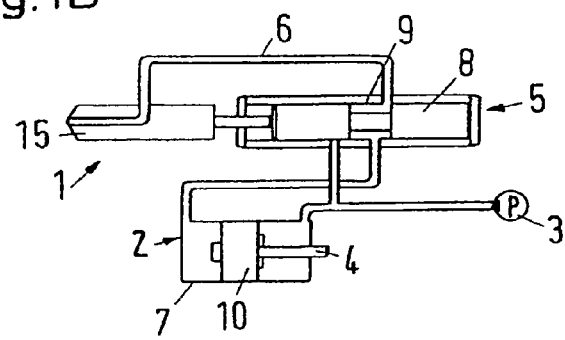
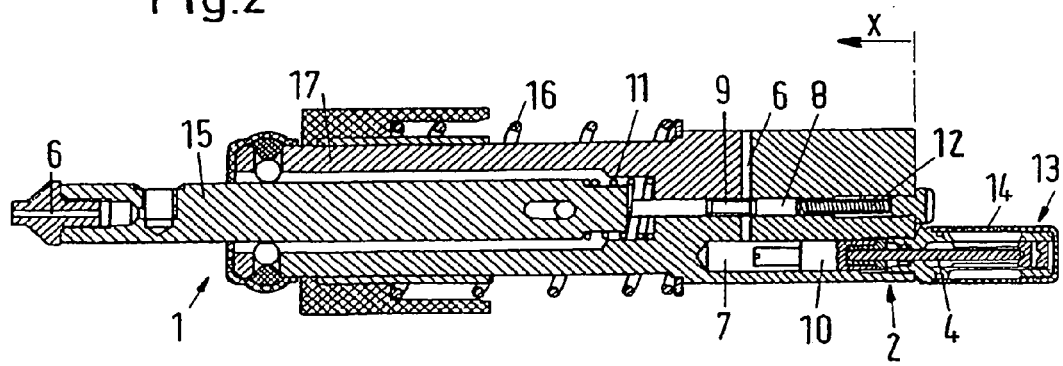

LUBRICATING DEVICE AND LUBRICATION APPARATUS COMPRISING SAID DEVICE

This application is a Divisional of U.S. application Ser. No. 10/535,829, filed May 20, 2005, now U.S. Pat. No. 7,677,361, which is a national stage application of International application No. PCT/EP2004/005463, filed May 21, 2004.

BACKGROUND OF THE INVENTION

The invention relates to a lubricating device, in particular for application in an apparatus for lubricating migrating lubrication sites, for example on a roller or chain belt, in which a lubricant discharge body of a lubricating head, which, during the filling of lubricant by a feed pump into a dosing chamber separated from the lubricant discharge channel, is located in a forward standby position, and which can be displaced against the action of a reset force backwardly across a blocking and lubricant release position, in which, on the one hand, the connection between feed pump and dosing chamber is blocked by a reversing piston, and, on the other hand, the dosing chamber is in fluidic connection with the lubricant discharge channel, and a specifiable lubricant volume can be delivered from the dosing chamber into the lubricant discharge channel.

In a known lubricating device the lubricant feed line from the feed pump terminates in a dosing chamber, which is provided between a reversing piston and the rearward end of a lubricant discharge body, both of which, coaxially with one another, are axially displaceable in a base body. The lubricant discharge body is therein stayed via a reset spring on the base body, which presses the lubricant discharge body in the direction of a forwardly advanced standby position. If the lubricant discharge body is displaced rearwardly against the action of this reset spring, the lubricant feed line from the feed pump to the dosing chamber is blocked by the rearward end of the lubricant discharge body. Upon pressing the lubricant discharge body further backward, the lubricant discharge body displaces the reversing piston so far that a lubricant discharge channel from the dosing chamber within the base body to the lubricant discharge site at the tip of the lubricant discharge channel is unblocked via an annular space in the central region of the lubricant discharge body. While this known lubricating device is reliable in terms of its function, however relatively expensive in production, the dosing of the quantity of lubricant to be delivered is difficult.

SUMMARY OF THE INVENTION

The present invention addresses the problem of proposing a lubricating device of the above described type, which with a simpler structure ensures an even more reliable delivery of a dosed quantity of lubricant.

According to the invention this problem is resolved in a lubricating device of the above described type, in which the lubricant discharge body cooperates with a reversing piston such that the feed pump is fluidically connected with the dosing chamber of a dosing piston/cylinder configuration via an annular space of the reversing piston when the lubricant discharge body is located in a forward standby position, and in which the dosing chamber is fluidically connected with the lubricant discharge channel via the annular space when the lubricant discharge body is located in the rearwardly displaced lubricant release position. The reversing piston blocks the fluidic connection between feed pump and dosing chamber, and the quantity of lubricant provided for delivery can be transported by means of a dosing piston acted upon by the feed pump from the dosing chamber in the direction toward the annular space.

Apart from the simple structure of the lubricating device, in this way the special advantage is attained that a particular precisely dosed lubricant quantity is delivered from the lubricant discharge body under the action of pressure of the feed pump.

The lubricant discharge body and reversing piston within a base body of the lubricating device can therein be axially oriented toward one another and be jointly displaceable in the axial direction.

To monitor the lubricating device visually, the dosing piston can be equipped with an indicator pin, which is visible in the configuration of dosing piston and cylinder configuration or projects from it.

The displacement path of the dosing piston of the dosing piston/cylinder configuration, and therewith the dosing volume, is preferably settable by means of an adjustment device, with the stroke of the dosing piston being regulatable, for example, via the indicator pin.

On its side facing away from the lubricant discharge body the reversing piston can be stayed on a reset spring, which, after the completion of the lubrication process, advances the reversing piston from its release position, in which the dosing chamber is fluidically connected with the lubricant discharge channel via the annular space developed as a circumferential groove, into its forward blocking position, in which the annular space unblocks the connection between feed pump and dosing chamber.

An especially simple device structure is obtained if the reversing piston is developed as a separate structural part projecting from the lubricant discharge body and the rearward end of the lubricant discharge body is stayed on the reversing piston.

The efficiency of the lubricating device is subsequently still further improved if the lubricant discharge body is stayed on a reset spring, which presses the lubricant discharge body in the direction toward its forward initial position and against which the lubricant discharge body must be shifted in the direction of its rearward lubricant release position.

For carrying out a lubrication process, the lubricating head is preferably pneumatically or hydraulically sealingly pressable onto a lubrication site, in particular if the displacement path of the lubricating device base body relative to the plane of motion of the lubrication site is greater than the displacement path of the lubricant discharge body relative to the lubricating device base body.

The lubricating head can further be equipped with a compression spring for resetting the head into its initial position after a lubrication process.

The invention relates further to an apparatus for lubricating migrating lubrication sites, for example located on a roller or chain belt, in particular with a lubricating device of the previously described type, with a catch arm supporting a catch head for carrying the lubricating head along with the migrating lubrication site.

Such a lubrication apparatus is to be simple in structure and reliable in function. The lubricating head, during the temporary carrying along of the lubricating device with the lubricating site to be supplied, should in particular be capable of being automatically guided to it and pressed against it.

This problem is resolved in a lubrication apparatus of the above described type resolved in which the lubricating head and catch head are displaceable by means of spring force and/or pneumatically and/or hydraulically from a rearwardly displaced initial resting position essentially in the direction of the roller or chain belt into a forwardly advanced standby catch position. Furthermore, the lubricating head and catch head, preferably jointly, are swivelably pivoted by means of parallel linkage bars on a securement plate for swiveling the lubricating head and catch arm from the forwardly advanced standby catch position into a working catch position, in which the catch head engages the roller or chain belt and the lubricating head is pressed onto the lubrication site forming a seal.

When for the supply of a specific lubrication site or a specific group of lubrication sites the catch head is advanced forwardly and, for example, is taken along with the roller or chain belt, the lubricating head or a group of lubricating heads is in this way perforce guided to the lubricating sites and therefore the delivery of a predetermined lubricant quantity is sealingly pressed onto the lubrication site(s).

The displacement of the lubricating head and catch head preferably takes place by means of a jointly arranged piston/cylinder configuration.

The lubricating head and catch head can therefore also be displaced by two separate piston/cylinder configurations, which is even necessary if the catch head cannot engage into the roller or chain belt laterally.

In the latter case, the lubricating head and catch head are displaced into directions orthogonal with respect to one another, thus the lubricating head from the side and the catch head from above or from below, with respect to the roller or chain belt.

The displacement path of the catch head in the direction of the plane of the lubrication site movement is preferably greater than that of the lubricating head when catch head and lubricating head are displaced parallel with respect to one another laterally in the direction of the roller or chain belt.

The swivel motion which, due to the parallel linkage bar configuration, lubricating and catch head carry out upon the initiation of the lubricating process, i.e. from the standby catch position into the final working catch position, can take place against the action of a reset force, for example a tension spring, such that after the lubrication process has been completed and the pull-back of the catch arm from its engagement position, lubricating head and catch head are guided back again by means of the parallel linkage bar configuration into their standby catch position.

In an especially advantageous embodiment of the invention a catch arm support, on which engages a piston/cylinder configuration, comprises a guidance rod, on which a compression spring is disposed for the automatic guiding back of the catch head from a forwardly advanced standby catch position into its rearwardly displaced initial resting position if a pressure reversing of the piston/cylinder configuration, with the aid of which the catch head has been brought into its forwardly advanced standby catch position takes place after the completion of the lubrication process.

It is further of advantage if the catch head comprises at least one catch roller stayed on a compression spring, in order to keep the surface wear as low as possible.

To avoid damaging the lubricating device, the configuration of the lubricating head and catch head can be arrestable relative to the securement plate, for example by means of snap latches.

In a further development of the invented lubrication apparatus, the displacement and/or swiveling of the lubricating head and catch head for the initiation of a lubrication process at a migrating lubrication site can be triggerable manually and/or automatically for example directly or indirectly by the migrating lubrication site itself, for example by sensors and/or proximity switches.

Further aims, characteristics, advantages and application feasibilities of the invention are evident on the basis of the following description of embodiment examples in conjunction with the drawings. All described and/or graphically depicted characteristics form singly or in any desired combination the subject matter of the invention independently of their aggregation in individual claims or their reference back.

BRIEF DESCRIPTION OF THE DRAWINGS

In the drawings:

FIGS. 1A and 1B show schematically the fundamental structure and function principle of a lubricating device comprising the invention during the filling of the dosing chamber (FIG. 1A), and during the delivery of a predetermined quantity of lubricant from the lubricating head (FIG. 1B), FIG. 2 shows an embodiment of an inventive lubricating device according to FIG. 1 in longitudinal section.

DETAILED DESCRIPTION OF THE INVENTION

Figure 3:
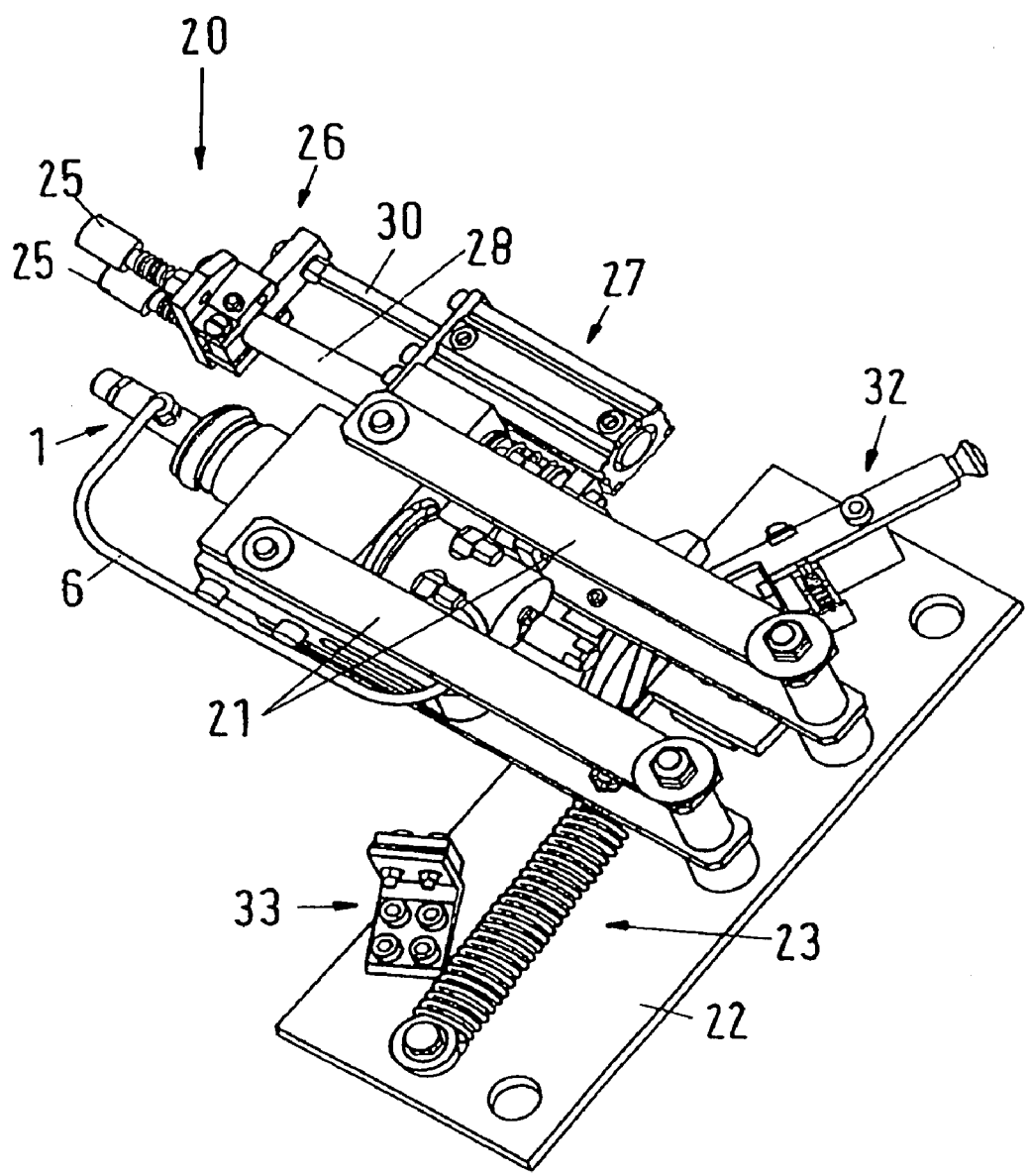
FIG. 3 is an oblique view of a lubrication apparatus comprising the invention, which can comprise a lubricating device according to FIGS. 1 and 2, FIGS. 4 and 5 show the lubrication apparatus according to FIG. 3 in top view and specifically in the swiveled-back initial resting position (FIG. 4) and before swiveled working catch position (FIG. 5).

The lubricating device according to FIGS. 1A, 1B and 2 comprises a lubricating head 1 with a lubricant discharge body 15, in which a lubricant discharge channel 6 extends up to its lubricant discharge opening at the front tip. The lubricant discharge body 15 is pivoted axially displaceable in a base body 17 of the lubricating head 1 and its rearward end is stayed on a reset spring 11. With its rearward end area the lubricant discharge body 15 is in contact on the front end of a reversing piston 8, which with the lubricant discharge body 15 is axially displaceable coaxially in the base body 17 and which, in turn, on its rearward end is stayed on a reset spring 12. Due to a circumferential groove provided in its central region, the reversing piston 8 forms with the base body 17 an annular space 9, which, in the operating position depicted in FIG. 2, is fluidly connected, on the one hand, with a dosing chamber 7 of a dosing piston/cylinder configuration 2 screwed into the base body 17 and, on the other hand, with the lubricant discharge channel 6.

The dosing chamber 7, also developed in the base body 17, is delimited by a dosing piston 10 of the dosing piston/cylinder configuration 2. As is evident in FIGS. 1A and 1B, the backside as well as also the front side facing the dosing chamber 7 of the dosing piston 10 is directly or indirectly connectable with a feed pump 3 for lubricant. On its back side the dosing piston 10 supports an indicator pin 4, which permits the visual checking of the position of the dosing piston 10 through a transparent cap 14, and therewith the efficiency of the lubricating device. By means of an adjustment device 13 for the indicator pin 4 the adjustable stroke, and therewith the dosing quantity to be delivered, is settable without requiring the disassembly of the remaining parts of the lubricating head 1.

Apart from the reset spring 11, the lubricating head 1 can overall be pressed pneumatically or hydraulically in direction X against the action of a compression spring 16 sealingly against the lubrication site to be lubricated, for example on a (not shown) roller or chain belt, the pressure at which it is pressed being regulatable.

In FIG. 1A, the lubricant discharge body 15 as well as also the reversing piston 8 of the reversing piston/cylinder configuration 5 is located in its front standby position. In this position the feed pump 3 is connected via a supply line 18 and the annular space 9 with the dosing chamber 7, such that the dosing chamber 7, while the dosing piston 10 is being pushed back, can be filled with the provided dosing quantity of lubricant, since the effective area of the dosing piston 10 facing the dosing chamber 7 is greater than that facing away.

When lubricant discharge body 15, and therewith reversing piston 8, are transferred at the beginning of the lubrication process through the tight pressing onto the lubrication site, for example of the roller or chain belt, into the rearwardly displaced position depicted in FIG. 1B, the lubricant supply from the feed pump 3 to the dosing chamber 7 is blocked by means of the left portion of the reversing piston 8 and the right portion of the reversing piston 8 unblocks the annular space 9 to the lubricant discharge channel 6. In this way the dosing piston 10 is displaced with the aid of the feed pressure of the feed pump 3 (in the drawing from the right to the left side), in order to deliver the quantity of lubricant present in the dosing chamber 7 of the dosing piston/cylinder configuration 2 into the connection line to the annular space 9 and therewith the lubricant discharge channel 6.

If, at the completion of the lubrication process, due to the lift-off of the lubricating head 1 from the lubrication site of the lubricant discharge body 15 and the reversing piston 8 due to the reset spring 11 and 12, respectively, are moved back again into their initial position depicted in FIG. 1A, the feed pressure of the feed pump 3 acts again onto the end area facing the dosing chamber 7, of the dosing piston 10, which is greater than the rearward end area such that the dosing piston 10 with the filling of the dosing chamber 7 (in the drawing from the left to the right side) is pushed back again. The lubricant quantity behind the dosing piston 10 is also transported via the annular space 9 in the direction of the dosing chamber 7.

Figure 4:
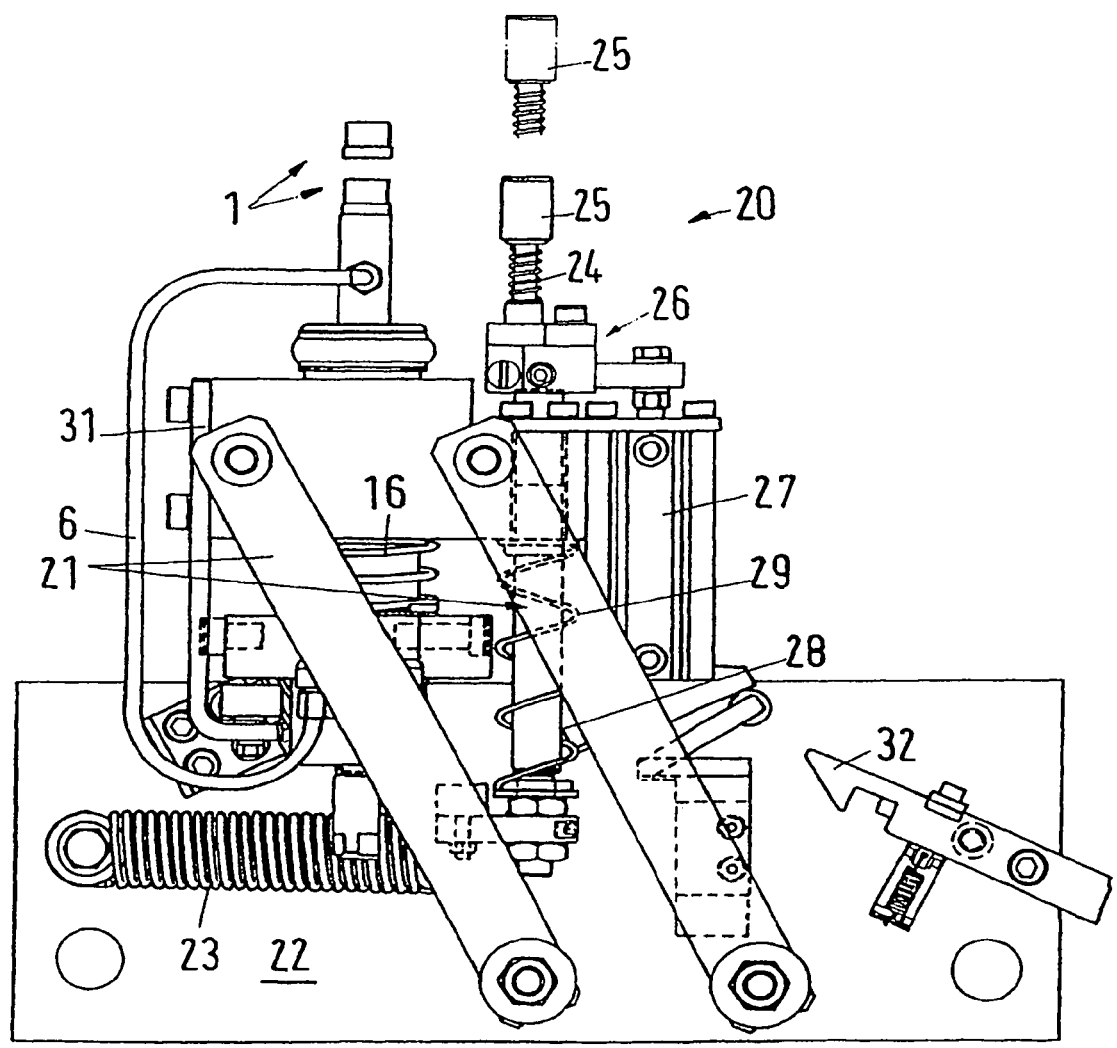
Figure 5:
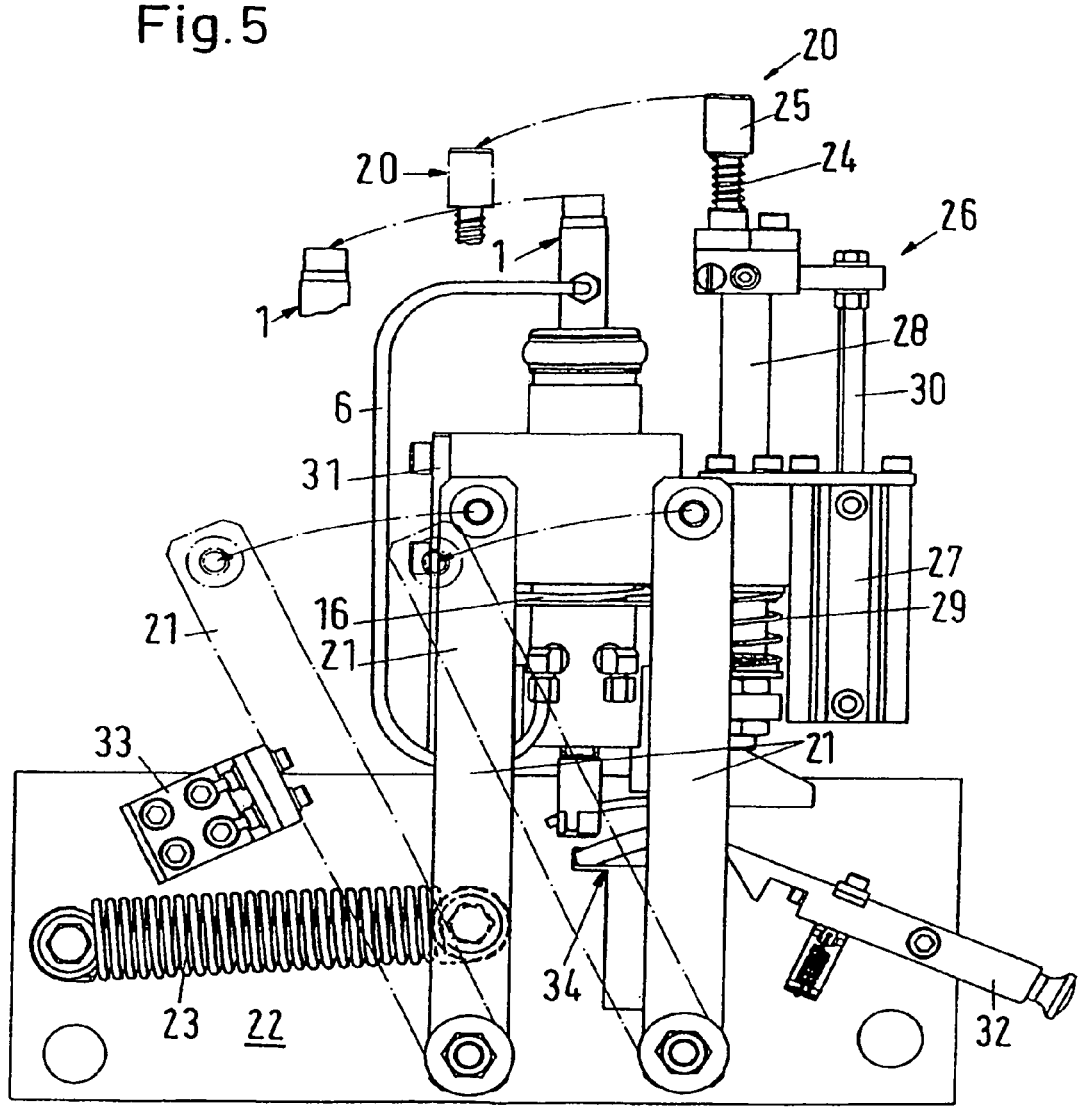

The lubrication apparatus depicted in FIGS. 3 to 5 can be equipped with a lubricating device according to FIGS. 1 and 2. However, it is also suitable for lubricating devices of conventional (described in the introduction) type or other types, if it operates with a lubricating head and at least one catch head.

In the depicted embodiment of the lubrication apparatus, lubricating head 1 and a catch arm 20 supporting a catch head 25 are jointly pivoted swivelably by means of at least one configuration of parallel linkage bars 21 on a securement plate 22. In the depicted case, the catch head 25 is provided for the engagement into a (not depicted) roller or chain belt, in order for the lubricating device temporarily, i.e. for the length of the lubrication process, to be carried along at the speed of the roller or chain belt comprising the lubrication sites to be supplied. Details of the manner in which this can be carried out for example are described in further detail in DE 201 14 728 U, to which for the purpose of disclosure reference is expressly made here.

The catch head 25 is accommodated by means of catch arm 20 at the front end of a guidance rod 28 of a catch arm support 26 and comprises, for example, two catch rollers or pins, each of which is stayed rearwardly on a compression spring 24. On the catch arm support 26 engages a piston/cylinder configuration 27 via a piston rod 30. In this way, as shown in FIG. 4, the catch head 25—as well as the lubricating head 1—can be moved laterally with respect to the roller or chain belt from a rearwardly displaced initial resting position into a forwardly advanced standby catch position. In this position the catch head 25 can for example be engaged laterally into a roller or chain belt comprising the migrating lubrication site to be supplied. Pushing forward the catch head 25 takes place against the action of a reset spring 29 developed as a compression spring, which, after the completion of the lubrication process and the pressure reversal of the piston/cylinder configuration 27, moves the catch arm 20 back again into the standby catch position depicted in FIG. 4.

Apart from the catch arm configuration, the lubricating head 1 is swivelably connected via a lubricating head holder 31 and via the configuration of parallel linkage bars 21 with the securement plate 22, and connected via the lubricant discharge channel 6 developed as a tubing to the (not depicted) lubricant supply.

At the start of a lubrication process, the actuation of the piston/cylinder configuration 27 is triggered for example by the particular lubrication site itself through proximity switches or manually. Thereby the lubricating head 1 and catch arm 20, as evident in FIG. 4, are displaced from the rearwardly displaced initial resting position into the forwardly advanced standby catch position. The displacement path of the catch head 25 is therein greater than that of the lubricating head 1, in order to be already able to engage into the roller or chain belt, before the lubricating head 1, carried along by swiveling, is swiveled on the lubrication site and is pressed onto it forming a seal.

If, based on the shifting forward illustrated in FIG. 4, the catch head 25 engages said roller or chain belt, the configuration of catch head 25 and lubricating head 1 is moved from the standby catch position depicted in FIG. 4 into the operating catch position depicted in FIG. 5 in full lines of the configuration of parallel linkage bars 21, and specifically against the action of a reset spring 23 developed as a tension spring. The path of motion, which is carried out by the catch arm 20 and the lubricating head 1, are indicated in FIG. 5. When the parallel linkage bar configuration 21 has reached the vertical working catch position depicted in FIG. 5 in full lines, and therein the dosed lubricant quantity has been delivered by the lubricating head 1 to the lubrication site, through a for example mechanical reversing valve 34 the piston/cylinder configuration 27 is reversed and therewith the catch head 25 and the lubricating head 1 are pulled out of engagement with the roller or chain belt, such that the configuration of lubricating head 1 and catch head 25 are swiveled back by the tension spring 23 into its initial resting position again and specifically up to a stop 33 on the securement plate 22 for the parallel linkage bars 21.

In order to avoid damaging the lubrication apparatus, the configuration can further be arrested by means of a snap latch 32, for example if it impermissibly skips a lubrication site.

The lubrication apparatus can operate manually or automatically, the lubrication process being triggerable by the particular lubrication sites themselves. Herein can be set for example the lubrication cycles, and, in the event, for example, that the roller or chain belt has too high a speed, can be determined by counting the lubrication sites, such that only every second lubrication site is lubricated in one cycle.

In the previously described embodiment type of the lubrication apparatus, the piston/cylinder configuration 27 has two functions; a first function to push forward the, for example, fork-shaped catch arm 20 into a standby catch position, and a second function to press onto the lubrication site the lubricating head 1 formed, for example, by a lubrication nipple.

In the case of roller or chain belts to be lubricated, it may, however, occur that the catch head 25, due to broad frontage-installed side bars, cannot engage into the roller or chain belt from the side. In particular for this case, the piston/cylinder configuration 27 retains only the previously cited second function. The catch arm 20 in this case is equipped at its front end with a second piston/cylinder configuration, which brings into the engagement with the roller or chain belt the catch head 25, developed for example as roller or pin, from above or below.

LIST OF REFERENCE SYMBOLS

1 Lubricating head
2 Dosing piston/cylinder configuration
3 Feed pump
4 Indicator pin
5 Reversing piston/cylinder configuration
6 Lubricant discharge channel
7 Dosing chamber
8 Reversing piston
9 Annular space (circumference groove)
10 Dosing piston
11 Reset spring (compression spring)
12 Reset spring (compression spring)
13 Adjustment device
14 Cap
15 Lubricant discharge body
16 Compression spring
17 Base body
18 Supply line
20 Catch arm
21 Parallel linkage bar
22 Securement plate
23 Tension spring (reset spring)
24 Compression spring
25 Catch head (catch roller, catch pin)
26 Catch arm support
27 Piston/cylinder configuration
28 Guidance rod
29 Compression spring (reset spring)
30 Piston rod
31 Lubricating head holder
32 Snap latch
33 Stop
34 Reversing valve
X Direction of pressing

The invention claimed is:

1. An apparatus for lubricating migrating lubrication sites, with a catch arm supporting a catch head for carrying along of the lubricating head with the migrating lubrication site to be lubricated, characterized in that lubricating head and catch head are displaceable by means of spring force and/or pneumatically and/or hydraulically from a rearwardly displaced initial resting position substantially in the direction of the roller or chain belt into a forwardly advanced standby catch position, and that lubricating head and catch arm are jointly swivelably pivoted by means of parallel linkage bars on a securement plate for swiveling of lubricating head and catch head from the forwardly advanced catch standby position into a working catch position, in the latter position the catch head engages into the roller or chain belt and the lubricating head is pressed sealingly onto the lubrication site.

2. The apparatus as claimed in claim 1, wherein the displacement of lubricating head and catch head takes place by means of a joint piston/cylinder configuration.

3. The apparatus as claimed in claim 1, wherein the displacement of lubricating head and catch head takes place by means of two separate piston/cylinder configurations.

4. The apparatus as claimed in claim 3, wherein lubricating head and catch head are displaceable in directions orthogonal with respect to one another.

5. The apparatus as claimed in claim 1, wherein the displacement path of the catch head is greater than that of the lubricating head when the catch head and the lubricating head are displaced parallel to one another in the direction of the roller or chain belt.

6. The apparatus as claimed in claim 1, wherein the swivel motion of the lubricating head and of the catch head from the standby catch position into the working catch position takes place against the action of a reset force, for example of a tension spring.

7. The apparatus as claimed in claim 1, wherein a catch head support, on which engages the piston/cylinder configuration, comprises a guidance rod, on which a compression spring is disposed for resetting the at least one catch head from its forwardly advanced catch position into its rearwardly displaced initial resting position upon the pressure reversal of the piston/cylinder configuration.

8. The apparatus as claimed in claim 1, wherein the catch head comprises at least one catch roller or catch pin stayed on a compression spring.

9. The apparatus as claimed in claim 1, wherein the configuration of lubricating head and catch head is arrestable relative to the securement plate.

10. The apparatus as claimed in claim 1, wherein the displacement and/or swiveling of the lubricating head and the catch head for the initiation of a lubrication process at a migrating lubrication site can be triggered manually and/or automatically, for example directly or indirectly by the migrating lubrication site itself, for example by sensors and/or proximity switches.

* * * * *